United States Patent [19]
Eichhorn

[11] Patent Number: 5,843,546
[45] Date of Patent: Dec. 1, 1998

[54] SHEET OF GLASS WITH ROUGHED BAND AND GROOVE PATTERN TO PROVIDE DECORATIVE VISUAL EFFECT

[75] Inventor: Keith L. Eichhorn, High Point, N.C.

[73] Assignee: Glass Unlimited of High Point, Inc., High Point, N.C.

[21] Appl. No.: 629,583

[22] Filed: Apr. 9, 1996

[51] Int. Cl.[6] .............................. B32B 3/28; A47G 35/00
[52] U.S. Cl. .............................. 428/38; 428/34; 428/156; 428/167; 428/187; 428/410; 428/542.2; 52/204.59; 52/311.1; 52/786.1
[58] Field of Search .................. 428/34, 167, 542.2, 428/38, 156, 141, 187, 210, 410, 426, 543; 52/786.1, 204.59, 311.1

[56] References Cited

U.S. PATENT DOCUMENTS

| | | | |
|---|---|---|---|
| D. 184,141 | 12/1958 | Mook | D33/9 |
| D. 276,188 | 10/1984 | Metzner | D28/25 |
| D. 285,505 | 9/1986 | Billiet | D6/300 |
| D. 288,746 | 3/1987 | Allekotte | D6/300 |
| 773,306 | 10/1904 | Wadsworth | 428/167 |
| 1,785,401 | 12/1930 | Zuckerberg | 428/167 |
| 1,929,893 | 10/1933 | Kinney | 51/92 |
| 2,071,411 | 2/1937 | Lamesch | 73/54 |
| 2,294,940 | 9/1942 | Skolnik | 88/105 |
| 3,346,410 | 10/1967 | McCarthy | 117/8 |
| 3,389,113 | 6/1968 | Yoshida et al. | 156/24 |
| 3,612,030 | 10/1971 | Blum | 125/1 |
| 3,678,628 | 7/1972 | McMaster | 51/5 |
| 4,011,692 | 3/1977 | Bos et al. | 51/323 |
| 4,029,531 | 6/1977 | Marinelli | 156/647 |
| 4,046,619 | 9/1977 | Rice et al. | 156/645 |
| 4,129,671 | 12/1978 | Greenberg | 428/48 |
| 4,138,515 | 2/1979 | Dial | 428/30 |
| 4,268,347 | 5/1981 | Stephens | 156/628 |
| 4,495,739 | 1/1985 | Drennan | 428/67 |
| 4,813,990 | 3/1989 | Thorn | 65/105 |
| 4,814,213 | 3/1989 | Thorn | 428/34 |
| 4,975,307 | 12/1990 | Sollogoub | 428/34 |
| 5,571,599 | 11/1996 | Eichhorn | 428/167 |

FOREIGN PATENT DOCUMENTS

| | | |
|---|---|---|
| 0 380 832 | 8/1990 | European Pat. Off. . |
| WO 88/02298 | 4/1988 | WIPO . |

OTHER PUBLICATIONS

Photocopies of Kinkead Division E6977 drawing (4 pages); date stamped Sep. 29, 1989.
Ref. C (photocopy); no date, no page number; no title; no author; believed to be prior art.
Photocopy of catalog sheets (7 pages) —Universal Art Glass Catalogue No. 310; Art & Beveled Glass; Shattock & McKay Company, Chicago; Feb., 1910.

*Primary Examiner*—Donald Loney
*Attorney, Agent, or Firm*—Rhodes, Coats & Bennett, L.L.P.

[57] ABSTRACT

A decorative glass sheet and a method and apparatus for forming the same. The decorative glass sheet includes a glass panel having opposed surfaces with at least one decorative band formed in at least one of the surfaces. The decorative band includes a roughed band which provides a frosted appearance. A remaining portion of the surface is not covered by the decorative band. The decorative band contrasts with the remaining portion of the surface to provide a unique visual effect including the simulation of a muntin on the glass panel. In preferred embodiments, one or more straight walled grooves are formed in the surface parallel to and immediately adjacent the roughed band.

23 Claims, 4 Drawing Sheets

SHEET OF GLASS WITH ROUGHED BAND AND GROOVE PATTERN TO PROVIDE DECORATIVE VISUAL EFFECT

FIELD OF THE INVENTION

The present invention is directed to decorative glass, and more specifically to annealed or tempered glass sheets of the type described in which a translucent, abraded band and one or more parallel, adjacent grooves are ground into at least one surface thereof for a distinctive visual effect.

BACKGROUND OF THE INVENTION

In recent years the interior and exterior design of buildings and structures, as well as the furnishings therefor, have employed increasing quantities of decorative glass. For example, it is now commonplace for glass sheets to be used in various types of doors such as shower doors, storm doors, patio doors, entry doors, bi-fold doors, and in decorative windows, mirrors, and other furniture and architectural applications. As the scope of architectural and design tastes expand, the industry has become receptive to glass sheet products which have unique visual effects.

One such visual effect is achieved by the use of a ground groove in the surface of such glass products. The groove is formed by grinding into the surface of an annealed glass sheeting, however, the glass sheets may subsequently be bent, or curved, or further processed (such as by tempering). A unique and attractive method for achieving a remarkable visual effect is disclosed in U.S. Pat. No. 5,409,416 to Eichhorn et al. In that patent is described a decorative glass sheet having a plurality of immediately adjacent parallel grooves and a method for forming the same. Such grooves have steeper walls, thereby achieving more extreme refraction and/or reflection results, more distortion, and therefore a more striking visual difference between the ribbed or grooved section and the other surface of the glass sheet.

Another related use for glass sheets is in insulated glass units (commonly referred to as "IGUs") as used in windows or patio doors for residential and commercial buildings. IGUs typically include a frame in which two sheets of glass or plexiglass are mounted in a parallel arrangement, supported by the frame which engages their respective peripheral edges. The panes define a gap therebetween and, in combination with the frame which spans the gap about the edges, form an enclosed airspace therein. The airspace serves an insulator.

One problem experienced with conventional IGUs involves the simulation of traditional paned windows. Traditional paned window generally consist of a plurality of panes separated by a grid of muntins. It is known to provide a grid of aluminum or like material secured to the inner surface (i.e., facing the gap) or outer surface of the inside glass panel (i.e., the panel adjacent the interior of the dwelling). These grids, being formed from materials having greater heat transfer properties than the air or vacuum in the airspace, compromise the insulating efficiency of the IGU.

Thus, there exists a need for a decorative glass sheet having a unique decorative visual effect. There exists a need for such a glass sheet which may be incorporated into insulated glass units and like applications. There exists a need for such a glass sheet which serves to simulate the muntins of a traditional pane glass window. There exists a need for a glass sheet of this type which does not unduly compromise the insulating ability of the insulated glass unit. There exists a need for such a glass panel which may be cost effectively manufactured. Moreover, there exists a need for a technique and tool for forming such a decorative glass sheet.

SUMMARY OF THE INVENTION

The present invention is directed to a decorative glass sheet including a glass panel having opposed surfaces. At least one decorative band is formed in at least one of the surfaces. The decorative band includes a roughed band which provides a frosted appearance. A remaining portion of the surface is not covered by the decorative band. The decorative band contrasts with the remaining portion of the surface to provide a unique visual effect including the simulation of a muntin on the glass panel.

The decorative band may further include at least one straight walled groove disposed parallel to and immediately adjacent the roughed band. The decorative band may include at least one such straight walled groove disposed on opposed sides of the roughed band, each of the grooves disposed parallel to the roughed band and two of the straight walled grooves disposed immediately adjacent the roughed band. Moreover, the decorative band may include a plurality of parallel, immediately adjacent straight walled grooves disposed parallel to the roughed band, at least one of the straight walled grooves disposed immediately adjacent the roughed band. In a preferred embodiment, a plurality of parallel, immediately adjacent straight walled grooves are disposed on opposed sides of the roughed band, the straight walled grooves disposed parallel to the roughed band and two of the straight walled grooves disposed immediately adjacent the roughed band.

A second decorative band may be formed in the surface and intersecting the first decorative band. Preferably, the roughed band is from about 4 to 10 mm wide. Preferably, the roughed band is recessed from about 0.2 to 0.5 mm with respect to the remaining portion of the surface. More preferably, the roughed band is recessed about 0.25 mm with respect to the remaining portion of the surface.

The present invention is further directed to an apparatus for forming a decorative glass sheet as described above. The apparatus includes a rough cut grinding wheel having a first prescribed profile. The first prescribed profile is such that the rough grinding wheel is operative to abrade the surface of the glass panel to simultaneously form the roughed band and a rough cut groove disposed parallel to and immediately adjacent the roughed band. The apparatus also includes a polishing wheel downstream of the rough cut grinding wheel. The polishing wheel has a second prescribed profile. The second prescribed profile is such that the polishing wheel is operative to polish the rough cut groove to form the at least one groove while not contacting the roughed band so that the roughed band remains unpolished. The apparatus further includes means for providing relative movement between the glass panel and the rough cut grinding wheel and the polishing wheel.

The apparatus may further include a finishing cut grinding wheel downstream of the rough cut grinding wheel and upstream of the polishing wheel. The finishing cut grinding wheel may have a profile substantially the same as the first prescribed profile. Alternatively, the finishing cut grinding wheel may have a profile substantially the same as the second prescribed profile.

The means for providing relative movement may include a conveyor to which the glass panel may be affixed. When the glass panel is so affixed, the conveyor is operable to convey the glass panel by the rough cut grinding wheel and thereafter by the polishing wheel. The means for providing relative movement may include a work table to which the glass panel may be affixed and a head supporting the rough cut grinding wheel and the polishing wheel and selectively moveable with respect to the work table.

The first prescribed profile may be configured such that the rough cut grinding wheel is operative to form at least one of the rough cut grooves on opposed sides of the roughed band and parallel and immediately adjacent to the roughed band, with the second prescribed profile configured such that the polishing wheel is operative to polish each of the rough cut grooves. Moreover, the first prescribed profile may be configured such that the rough cut grinding wheel is operative to form a plurality of parallel, immediately adjacent rough cut grooves disposed parallel to one another and to the roughed band with at least one of the rough cut grooves being immediately adjacent the roughed band, with the second prescribed profile configured such that the polishing wheel is operative to polish each of the rough cut grooves. Further, the first prescribed profile may be configured such that the rough cut grinding wheel is operative to form a plurality of parallel, immediately adjacent rough cut grooves disposed parallel to one another and to the roughed band on opposed sides of the roughed band with two of the rough cut grooves being disposed immediately adjacent the roughed band, with the second prescribed profile configured such that the polishing wheel is operative to polish each of the rough cut grooves.

In a preferred embodiment, the first prescribed profile includes a flat corresponding to the roughed band and a valley corresponding to a peak of the rough cut groove, the flat being raised from about 0.2 to 0.5 mm with respect to the valley. In a more preferred embodiment, the flat is raised about 0.25 mm with respect to the valley. Preferably, the flat has a width of from about 4 to 10 mm. In a preferred embodiment, the second prescribed profile includes a flat corresponding to the roughed band and a valley corresponding to a peak of the at least one groove, the flat being recessed from about 3 to 6 mm with respect to the valley.

The present invention is further directed to a method for forming decorative glass sheets as described above. The method includes the step of passing across the surface of the glass panel a rough cut grinding wheel having a first prescribed profile to abrade the surface of the glass panel so as to simultaneously form the roughed band and a rough cut groove disposed parallel to and immediately adjacent the roughed band. Thereafter, a polishing wheel having a second prescribed profile is passed across the upper surface of the glass panel to polish the rough cut groove so as to form the at least one groove while not contacting the roughed band so that the roughed band remains unpolished.

The method may further include subsequent to passing the rough cut grinding wheel and prior to passing the polishing wheel, the step of passing a finishing cut grinding wheel across the surface of the glass panel. Further, the step of passing the finishing cut grinding wheel may include passing a finishing cut grinding wheel having substantially the same profile as the first prescribed profile along the roughed band and the rough cut groove. The step of passing the finishing cut grinding wheel may include passing a finishing cut grinding wheel having substantially the same profile as the second prescribed profile along the rough cut groove.

The method may include affixing the glass panel to a work table prior to passing the rough cut grinding wheel across the surface of the glass panel. In such case, the step of passing the rough cut grinding wheel includes moving the rough cut grinding wheel relative to the work table, and the step of passing the polishing wheel includes moving the polishing wheel relative to the work table.

The method may include affixing the glass panel to a conveyor prior to passing the rough cut grinding wheel across the surface of the glass panel. In this case, the step of passing the rough cut grinding wheel includes moving the glass panel relative to the rough cut grinding wheel by means of the conveyor, and the step of passing the polishing wheel includes moving the glass panel relative to the polishing wheel by means of the conveyor.

The step of passing the rough cut grinding wheel may include forming at least one of the rough cut grooves on opposed sides of the roughed band and parallel to the roughed band, at least two of the rough cut grooves disposed immediately adjacent the roughed band, with the step of passing the polishing wheel including simultaneously polishing each of the rough cut grooves.

The step of passing the rough cut grinding wheel may include forming a plurality of parallel, immediately adjacent rough cut grooves, each of the rough cut grooves disposed parallel to the roughed band and at least one of the rough cut grooves disposed immediately adjacent the roughed band, with the step of passing the polishing wheel including simultaneously polishing each of the rough cut grooves. Moreover, the step of passing the rough cut grinding wheel may include forming a plurality of parallel, immediately adjacent rough cut grooves on opposed sides of the roughed band, each of the rough cut grooves disposed parallel to the roughed band and at least two of the rough cut grooves disposed immediately adjacent the roughed band, with the step of passing the polishing wheel including simultaneously polishing each of the rough cut grooves.

The method may further include the step of forming a second decorative band in the surface of the glass panel, the second decorative band intersecting the first decorative band.

The present invention is further directed to an insulated glass unit. The insulated glass unit includes a frame and a pair of opposed glass panels mounted in the frame and defining a gap therebetween. At least one of the glass panels is a decorative glass sheet as described above. Preferably, the decorative band or bands of the decorative glass sheet are formed in the surface thereof facing the gap.

An object of the present invention is to provide a decorative glass sheet having a unique decorative visual effect.

Another object of the present invention is to provide a decorative glass sheet having simulated muntins thereon.

An object of the present invention is to provide an insulated glass sheet having a simulated muntin feature as described above which may be incorporated in insulated glass units. Further, it is an object of the present invention to provide such a glass sheet wherein the simulated muntin feature does not unduly compromise the insulating efficiency of the insulated glass unit.

A further object of the present invention is to provide an insulated glass unit incorporating a glass sheet as described.

Another object of the present invention is to provide a decorative glass sheet as described above which may be cost effectively manufactured.

Yet another object of the present invention is to provide a technique and tool for forming the decorative glass sheet of the present invention.

Other objects and a fuller understanding of the present invention will become apparent upon reading the following detailed description of the preferred embodiment along with the accompanying drawings.

DETAILED DESCRIPTION OF THE PREFERRED EMBODIMENT

Figure 1:
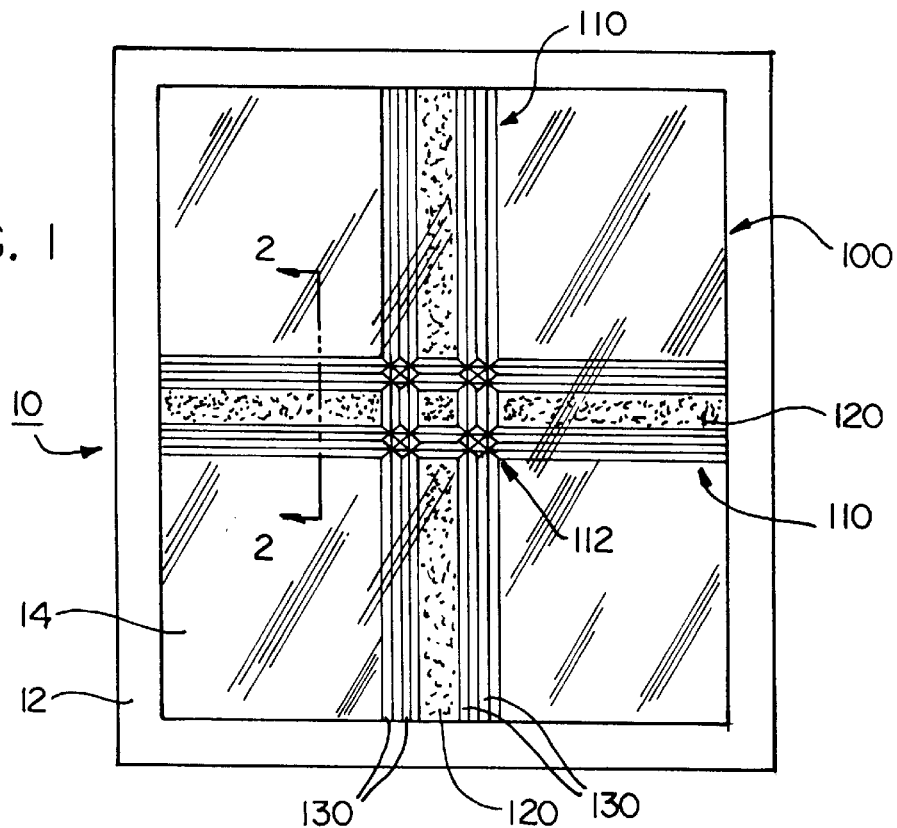
FIG. 1 is a front, elevational view of an insulated glass unit incorporating a decorative glass sheet according to the present invention.
Figure 3:
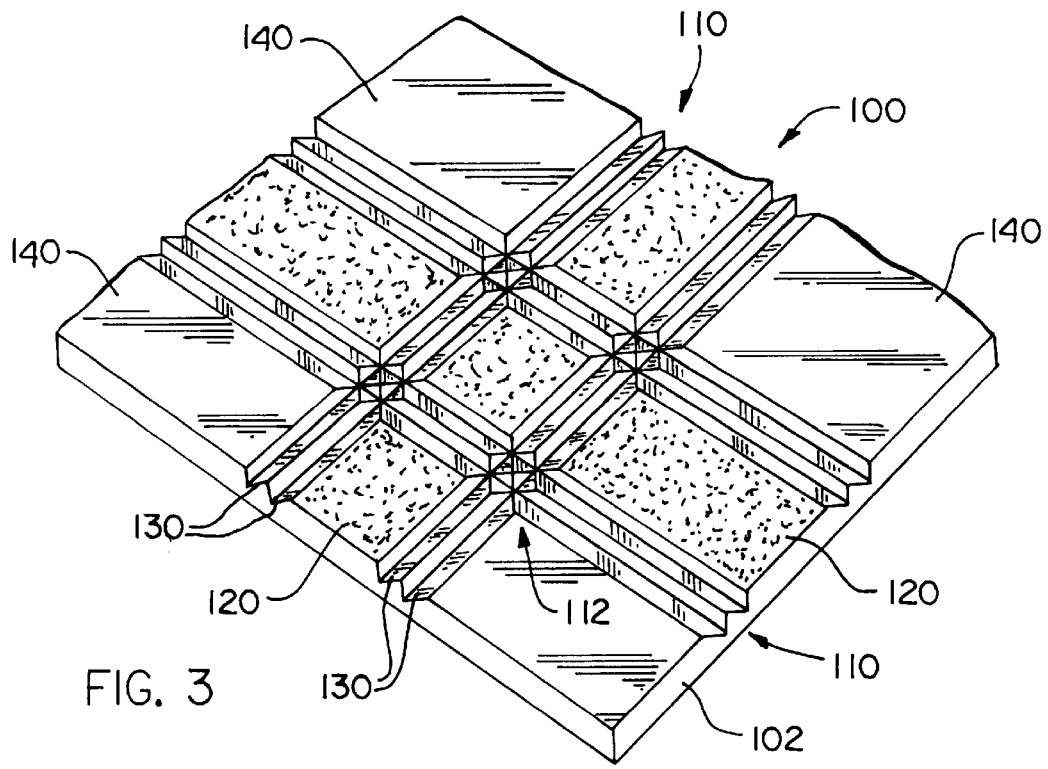
FIG. 3 is a perspective view of a portion of a sheet of glass grooved and abraded in accordance with the present invention.
Figure 2:
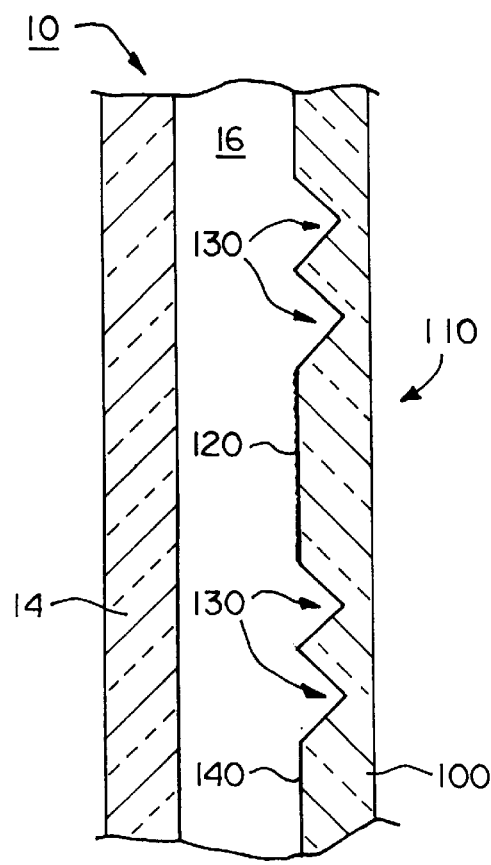
FIG. 2 is a fragmentary, side elevational view of the insulated glass unit as shown along the line 2—2 of FIG. 1.

With reference to FIGS. 1–3, there is shown therein an insulated glass unit 10 incorporating a decorative glass sheet 100 according to the present invention. Insulated glass unit 10 further includes outer, transparent glass sheet 14 and frame 12. Frame 12 supports glass panels 100 and 14 in spaced relation by engaging their respective peripheral edges (e.g., peripheral edges 102 of glass sheet 100 as seen in FIG. 3). More particularly, glass panels 14 and 100 are spaced so as to define a gap 16 therebetween. The construction of insulated glass unit 10, except as discussed below, is otherwise conventional and will be appreciated by those of ordinary skill in the art.

Decorative glass sheet 100 has formed in its surface adjacent gap 16 a pair of decorative bands 110. Decorative bands 110 form intersection 112. Each decorative band 110 includes a raised, roughed band 120 and a pair of grooves 130 on either side thereof. Grooves 130 extend immediately adjacent and parallel to one another and to roughed band 120. The peaks and valleys of grooves 130 may be rounded to form ribs or flutes (i.e., grooves with rounded bottoms). Thus, the word "grooves" should be understood to include flutes. Raised surfaces 140 are defined between peripheral edges 102 and decorative bands 110. Raised surfaces 140 may be untreated and thus transparent, or, if desired, coated, etched, or otherwise treated.

Roughed, raised bands 120 each have an abraded surface so that light passing therethrough from either direction is diffused, creating translucent or even semi-opaque light transmission. Bands 120 appear frosted. As a result, the relatively opaque character of bands 120 contrasts with the transparency of raised surfaces 140, thereby simulating muntins in the glass panel 100 to the viewer. Further contrast is provided by grooves 130. Preferably, grooves 130 are formed according to the method disclosed in applicant's U.S. Pat. No. 5,409,416 to Eichhorn et al., in which case the difference between grooves 130 and roughed bands 120 is striking. Such grooves cause a refraction of light rays which results in a distortion of objects on one side of the class when viewed from the other. The nature and character of roughed bands 120 and grooves 130 will be better appreciated from the description below of the means and methods for forming glass sheets according to the present invention.

The sheet of glass 100 is conventionally commercially available annealed glass which normally comes in thicknesses in the range of ⅛ inch and 1 inch. The glass may either be transparent, frosted, translucent, opaque, or reflective, though transparent is preferred. Depending on the application, glass sheet 100 may be tempered after decorative bands 110 have been formed therein.

Figure 4:
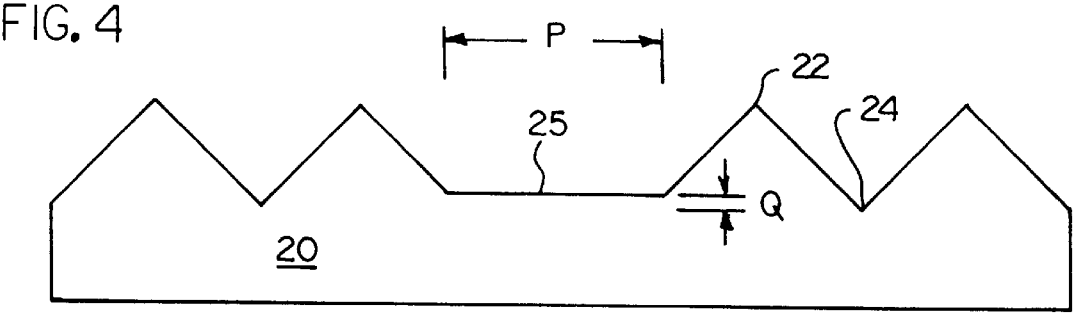
FIG. 4 is a fragmentary, sectional view of a diamond cutting wheel for executing a first pass.
Figure 5:
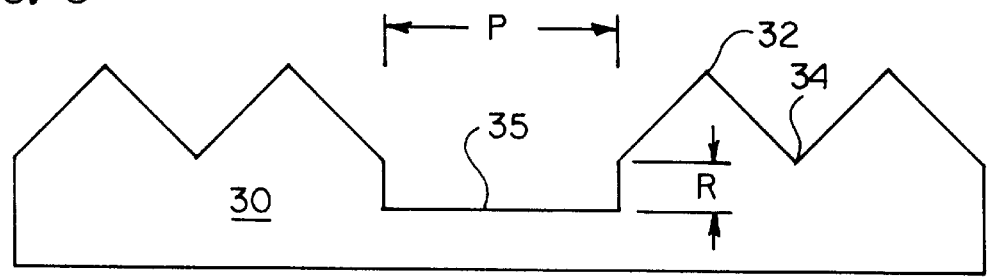
FIG. 5 is a fragmentary, sectional view of a polishing wheel for executing second and subsequent passes.

As will be explained hereinafter, the grooves 130 of decorative band 110 are formed by subjecting the glass sheet to a rough cut diamond grinding wheel 20 (FIG. 4), then to a finishing cut diamond grinding wheel, then to one or more polishing wheels 30 (FIG. 5). Rough cut wheel 20 is placed upstream of the polishing wheels 30 in a continuous operation, however, all grooves are rough cut simultaneously, then finish cut and polished simultaneously.

By contrast to the formation of grooves 130, roughed bands 120 are formed by subjecting the glass sheet to the rough cut diamond grinding wheel 20, and optionally the finishing cut diamond grinding wheel, however, no portion of the one or more polishing wheels 30 contacts the roughed band 120. Rather, roughed band 120 is formed by the rough cut diamond grinding wheel 20 and optionally the finishing cut wheel only.

Turning now to FIG. 4, there is illustrated schematically the surface of a rough grinding wheel 20, which is the mirror image of the groove and band pattern formed in the glass. Wheel 20 should be of a diamond particle composition held together by a suitable bonding material. As is shown in FIG. 4, the decorative bands 110 are formed by the surface of rough grinding wheel 20. The peaks 22 of rough grinding wheel 20 will correspond to the bottom of each groove 130 and the valleys 24 of grinding wheel 30 will correspond to the peaks of the grooves 130 in the glass sheet. Flat surface 25 will correspond to roughed band 120 of glass sheet 100. Dimension Q represents the distance by which flat surface 25 extends above peaks 24 of grooves 130, and, in particular, the distance by which the surface of glass panel 100 is reduced by the abrasion of flat surface 25 at roughed bands 120. P represents the width of flats 25 and 35, corresponding to the widths of bands 120.

Rough cut grinding wheel 20 is what is conventionally known as a "grinding wheel". That is, wheel 20 is of the type including particles or bits of diamond, marble, or like substance which serve to abrade or scar the surface of glass when forced into contact therewith.

Turning now to FIG. 5, there is illustrated schematically the surface of a polishing wheel 30, which is the mirror image of the groove pattern formed in the glass as well. In contrast to rough cut grinding wheel 20, polishing wheel 30 is what is conventionally known as a "polishing wheel". That is, wheel 30 is of the type formed from a material which serves to smooth and restore visual clarity to glass. Similarly, peaks 32 and valleys 34 of polishing wheel 30 will correspond to the valleys and peaks, respectively, of grooves 130. Flat surface 35 corresponds to the location of band 120. Notably, flat surface 35 is recessed so that when polishing wheel 30 is applied to the glass sheet to polish the grooves 130, surface 35 does not contact the glass sheet. Dimension R represents the distance by which flat surface 35 is recessed from the peaks of grooves 130, thereby providing clearance from roughed bands 120. In practice, polishing wheel 30 should have dimensions closer to the dimensions of grooves 130, rough cut wheel 20 being substantially similar with respect to the groove forming surfaces, except that the peaks and valleys will not be quite so deep. Further, the similarity between the profile of rough cut wheel 20 and polishing wheel 30 will depend on whether one or more finishing cut wheels as described below are employed. The actual dimensions and angular relationships between the grooves is preferably as described in applicant's U.S. Pat. No. 5,409,416 to Eichhorn et al., the disclosure of which is intended to be incorporated herein by reference.

The profile of the finishing cut grinding wheel or wheels may be the same as or similar to either the profile of the rough grinding wheel 20 or the polishing wheels 30, depending on whether it is desired to abrade the roughed band 120 with the finishing wheel. This will depend on the visual effect desired. The finishing cut grinding wheel or wheels are also what are conventionally known as "grinding wheels" as discussed above with regard to rough cut wheel 20.

With reference to FIGS. 4 and 5, the peak-to-peak distance of the grooves is preferably in the range of about 2 to 7 mm, with 3 mm most preferred. The depth of the grooves is preferably in the range of about 0.3 to 0.8 mm and most preferably 0.7 mm. Dimension Q is preferably in the range of about 0.2 to 0.5 mm with 0.25 mm most preferred. The R dimension is preferably from about 3 to 6 mm, most preferably 5 mm. Dimension P is preferably from about 4 to 10 mm. More preferably, dimension P is about 8 mm. It has been found that bands having a width P less than about 4 mm have a reduced visual effect as compared with bands in the described range.

Figure 6:
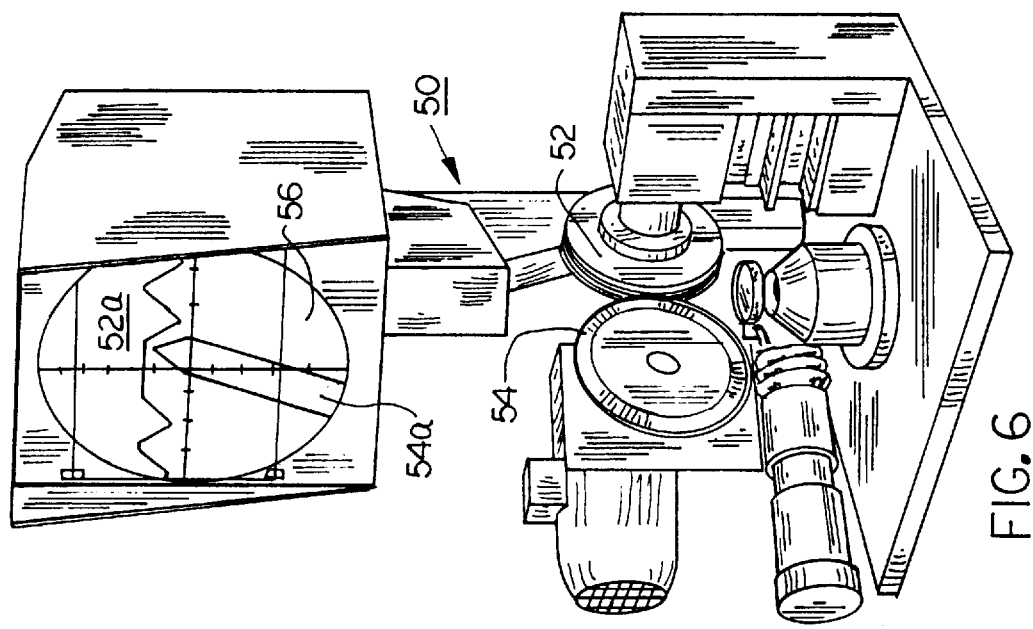
FIG. 6 is a perspective view of an apparatus used to form the grinding wheels.

Turning now to FIG. 6, there is illustrated an appropriate grinding wheel dressing apparatus. As can be seen in FIG. 6, the apparatus 50 includes a spindle for holding the workpiece 52 and a second precisely driven mounting apparatus for holding the dressing tool 54. The dressing tool 54 is moved back and forth and in and out with respect thereto to properly form and dress the wheel. To form the grooves, a first tool 54 is used to rough cut the general shape of the grooves. Then second tool with a denser diamond cutting wheel having an ⅛ wall thickness and a 60° included angle is used to form the final profile of the grooves on the grinding wheels. The apparatus 50 also includes a magnifying viewer 56 that illustrates and displays an enlarged picture of the grinding wheel and trimming tool. The enlargement is approximately 10 times. By using a template of the same scale as the viewing device, the grinding wheel may be moved back and forth and in and out appropriately to achieve the desired surface configuration.

Figure 7:
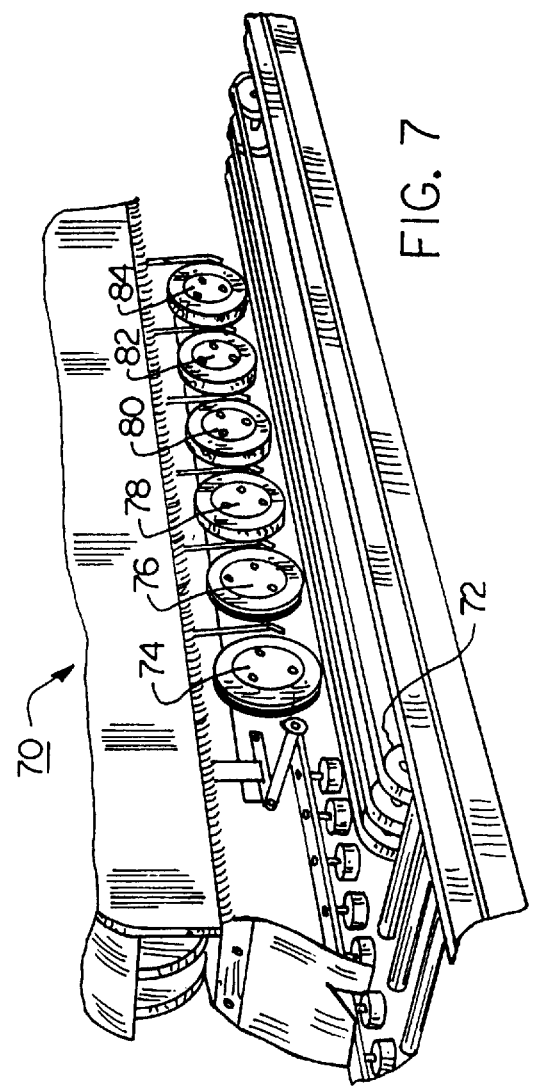
FIG. 7 is a perspective view of a portion of one type of a grinding machine set up to form the decorative bands of the present invention.

In FIG. 7, there is illustrated one type of grinding apparatus on which the glass sheet is positioned and moved. This is a relatively conventional apparatus 70 which includes a conveying apparatus 72 upon which the workpiece is placed. The conveyor moves the workpiece longitudinally past one or more grinding wheels 74, 76. The workpiece is held onto the conveyor by clamps or vacuum. As the workpiece is moved past the first grinding wheel 74 corresponding to rough cut grinding wheel 20, the rough cut of the grooves 130 and the roughing of the band 120 is formed. The workpiece then progresses past the second finishing wheel 76 where the finishing cut is formed in the grooves and, optionally, the band 120. Finally the grooves are polished by subjecting them to one or more polishing wheels 78, 80, 82, 84 corresponding to polishing wheel 30. Roughed bands 120 are not altered in this step. Notably, the roughed band and all of the grooves are rough cut simultaneously. All of the grooves are finish cut (with or without the roughed band, as discussed above) simultaneously. Further, the grooves are all polished simultaneously. This permits the grooves 130 and roughed bands 120 to be maintained parallel and adjacently spaced.

Alternatively, the workpiece can be held on a work table and subjected to a plurality of grinding and polishing wheels mounted on a movable, precisely controlled head. This might be more appropriate for a pattern in which the grooves 130 and roughed bands 120 are curved or not in a straight line. Suitable apparatus and methods for forming the decorative bands in this manner will be readily appreciated by those of ordinary skill in the art upon reading the foregoing.

The decorative glass panels according to the present invention may be varied as desired. For example, there may be more than two parallel grooves on either side of each roughed band 120. Alternatively, there may be only a single groove on either side of the roughed band. The roughed band may be provided with one or more grooves only on one side of the roughed band. The decorative glass sheet may be formed with one or more decorative bands which do not intersect.

Figure 8:
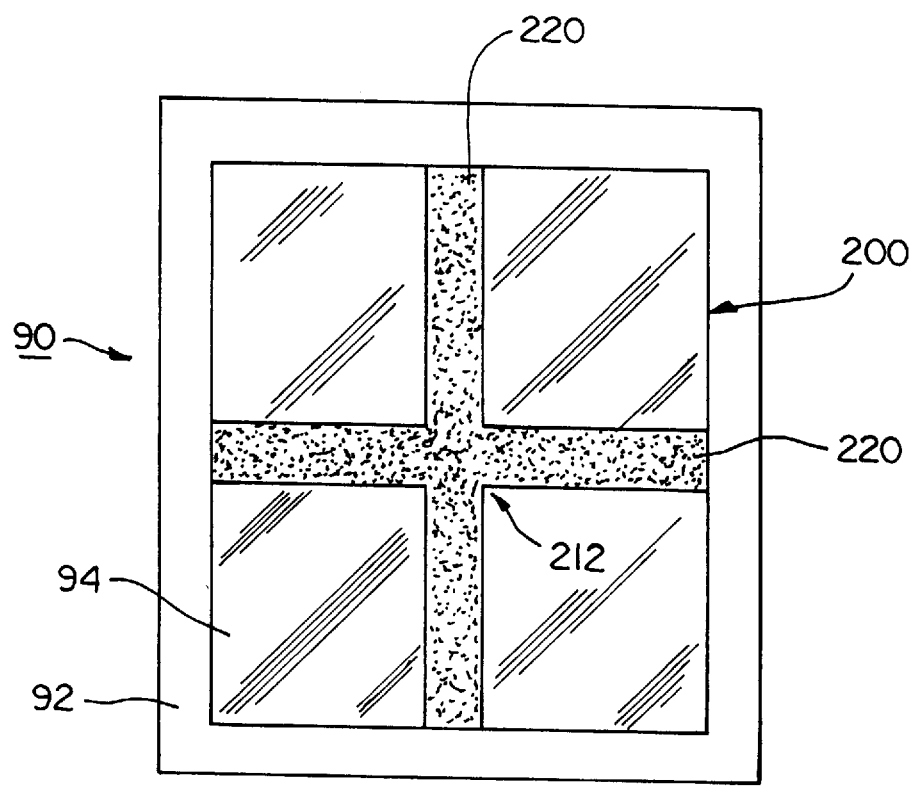
FIG. 8 is a front elevational view of an insulated glass unit incorporating a decorative glass sheet according to a second embodiment of the present invention.

Further, the roughed bands may be formed as described without any adjacent grooves, thereby simulating muntins without the refractive framework of the grooves as described. For example, an insulated glass unit 90 as shown in FIG. 8 includes a transparent glass sheet 94 and a frame 92 corresponding to elements 14 and 12, respectively, of insulated glass unit 10. Decorative glass sheet 200 has roughed bands 220 formed on the interior surface thereof and together forming intersection 212. Roughed bands 220 correspond to and may be formed in the same manner as roughed bands 120.

It will be appreciated that, if the decorative bands are formed on a surface of the glass panel of an insulated glass unit facing the gap between the panels as described, cleaning of the IGU will be much easier as only smooth surfaces of the glass panels are exposed to the environment.

While decorative glass sheets 100, 200 has been described in relation to an insulated glass unit, it will be appreciated that it may be used for other architectural glass applications. For example, the decorative glass sheets may be employed in patio doors, storm doors, shower doors, single panel windows, and like structures. Further, the decorative bands of the present invention may be formed in mirrored glass. Thus, a considerable and varied number of quite pleasing visual effects may be achieved for use in a wide range of applications.

There has been described and illustrated hereinabove a detailed description of a preferred embodiment. Obviously, various changes and modifications might be made to the embodiment described without departing from the scope of the invention which is set forth in the claims which follow.

What is claimed is:

1. A decorative glass sheet, comprising:
   a) a transparent glass panel having opposed surfaces;
   b) at least one decorative band formed on at least one of said surfaces, said decorative band including a roughed band providing a frosted appearance; and
   c) a remaining portion of said surface not covered by said decorative band, whereby said decorative band contrasts with said remaining portion of said surface to provide a unique visual effect including the simulation of a muntin on said glass panel.

2. The decorative glass sheet of claim 1 wherein said decorative band further includes at least one straight walled groove disposed parallel to and immediately adjacent said roughed band.

3. The decorative glass sheet of claim 1 wherein said decorative band further includes at least one straight walled groove disposed on opposed sides of said roughed band, each of said straight walled grooves disposed parallel to said roughed band and two of said straight walled grooves disposed immediately adjacent said roughed band.

4. The decorative glass sheet of claim 1 wherein said decorative band includes a plurality of parallel, immediately adjacent straight walled grooves disposed parallel to said roughed band, at least one of said straight walled grooves disposed immediately adjacent said roughed band.

5. The decorative glass sheet of claim 1 wherein said decorative band includes a plurality of parallel, immediately adjacent straight walled grooves disposed on opposed sides of said roughed band, said straight walled grooves disposed parallel to said roughed band and two of said straight walled grooves disposed immediately adjacent said roughed band.

6. The decorative glass sheet of claim 1 further including a second decorative band formed in said surface and intersecting said first decorative band.

7. The decorative glass sheet of claim 1 wherein said roughed band is from about 4 to 10 mm wide.

8. The decorative glass sheet of claim 1 wherein said roughed band is recessed from about 0.2 to 0.5 mm with respect to said remaining portion of said surface.

9. The decorative glass sheet of claim 8 wherein said roughed band is recessed about 0.25 mm with respect to said remaining portion of said surface.

10. A decorative glass sheet, comprising:
 a) a transparent glass panel having opposed surfaces;
 b) first and second decorative bands formed on at least one of said surfaces and intersecting one another, each of said first and second decorative bands including:
  i) a roughed band providing a frosted appearance; and
  ii) a plurality of parallel, immediately adjacent straight walled grooves disposed on opposed sides of said roughed band, said straight walled grooves disposed parallel to said roughed band and two of said straight walled grooves disposed immediately adjacent said roughed band; and
 c) a remaining portion of said surface not covered by said decorative band, whereby said decorative band contrasts with said remaining portion of said surface to provide a unique visual effect including the simulation of a muntin on said glass panel.

11. The decorative glass sheet of claim 10 wherein said roughed band is from about 4 to 10 mm wide.

12. The decorative glass sheet of claim 10 wherein said roughed band is recessed from about 0.2 to 0.5 mm with respect to said remaining portion of said surface.

13. The decorative glass sheet of claim 12 wherein said roughed band is recessed about 0.25 mm with respect to said remaining portion of said surface.

14. An insulated glass unit comprising:
 a) a frame;
 b) a pair of opposed transparent glass panels mounted in said frame and defining a gap therebetween; and
 c) at least one of said glass panels having opposed surfaces and comprising:
  i) at least one decorative band formed on at least one of said surfaces, said decorative band including a roughed band providing a frosted appearance; and
  ii) a remaining portion of said surface not covered by said decorative band, whereby said decorative band contrasts with said remaining portion of said surface to provide a unique visual effect including the simulation of a muntin on said glass panel.

15. The insulated glass unit of claim 14 wherein said decorative band further includes at least one straight walled groove disposed parallel to and immediately adjacent said roughed band.

16. The insulated glass unit of claim 14 wherein said decorative band further includes at least one straight walled groove disposed on opposed sides of said roughed band, each of said straight walled grooves disposed parallel to said roughed band and two of said straight walled grooves disposed immediately adjacent said roughed band.

17. The insulated glass unit of claim 14 wherein said decorative band includes a plurality of parallel, immediately adjacent straight walled grooves disposed parallel to said roughed band, at least one of said straight walled grooves disposed immediately adjacent said roughed band.

18. The insulated glass unit of claim 14 wherein said decorative band includes a plurality of parallel, immediately adjacent straight walled grooves disposed on opposed sides of said roughed band, said straight walled grooves disposed parallel to said roughed band and two of said straight walled grooves disposed immediately adjacent said roughed band.

19. The insulated glass unit of claim 14 further including a second decorative band formed in said surface and intersecting said first decorative band.

20. The insulated glass unit of claim 14 wherein said roughed band is from about 4 to 10 mm wide.

21. The insulated glass unit of claim 14 wherein said roughed band is recessed from about 0.2 to 0.5 mm with respect to said remaining portion of said surface.

22. The insulated glass unit of claim 21 wherein said roughed band is recessed about 0.25 mm with respect to said remaining portion of said surface.

23. The insulated glass unit of claim 14 wherein said surface in which said decorative band is formed is disposed adjacent said gap.

\* \* \* \* \*